United States Patent
Almblad

(10) Patent No.: US 10,842,311 B2
(45) Date of Patent: Nov. 24, 2020

(54) AUTOMATED COFFEE AND TEA MAKER AND AUTOMATED PRESSURE BREWER

(71) Applicant: Robert Almblad, Lynchburg, VA (US)

(72) Inventor: Robert Almblad, Lynchburg, VA (US)

( * ) Notice: Subject to any disclaimer, the term of this patent is extended or adjusted under 35 U.S.C. 154(b) by 502 days.

(21) Appl. No.: 15/669,917

(22) Filed: Aug. 5, 2017

(65) Prior Publication Data

US 2017/0347827 A1 Dec. 7, 2017

Related U.S. Application Data

(63) Continuation of application No. PCT/US2016/018675, filed on Feb. 16, 2016.
(Continued)

(51) Int. Cl.
*A47J 31/20* (2006.01)
*A47J 31/44* (2006.01)
(Continued)

(52) U.S. Cl.
CPC ............... *A47J 31/20* (2013.01); *A47J 31/32* (2013.01); *A47J 31/36* (2013.01); *A47J 31/40* (2013.01); *A47J 31/44* (2013.01); *A47J 31/60* (2013.01)

(58) Field of Classification Search
CPC .. A47J 31/20; A47J 31/32; A47J 31/36; A47J 31/40; A47J 31/44; A47J 31/60;
(Continued)

(56) References Cited

U.S. PATENT DOCUMENTS

| 3,171,344 A | 3/1965 | Mathieu et al. |
| 3,208,369 A | 9/1965 | Greenly et al. |

(Continued)

FOREIGN PATENT DOCUMENTS

DE 2432141 1/1976

OTHER PUBLICATIONS

International Search Report for PCT/US2016/018675 dated Jun. 21, 2016.
(Continued)

*Primary Examiner* — Tu B Hoang
*Assistant Examiner* — Vy T Nguyen
(74) *Attorney, Agent, or Firm* — Michael J. Nickerson; Basch & Nickerson LLP

(57) ABSTRACT

A full immersion brewing system includes an immersion chamber; an extraction material mechanism for introducing extraction material into the immersion chamber; an infusion mechanism for introducing heated liquid and pressurized air into the immersion chamber; and a drain/dispensing mechanism for dispensing, through a filter, infused liquid from the immersion chamber and for enabling removal of extraction material from the immersion chamber. The filter prevents extraction material from being dispensed from the immersion chamber. When the drain/dispensing mechanism is in a first position, infused liquid is dispensed through the filter, and when the drain/dispensing mechanism is in a second position, the filter is positioned so that extraction material and liquid is dispensed without going through the filter. The full immersion brewing system includes a cleaning mechanism for cleaning the immersion chamber and the filter.

8 Claims, 18 Drawing Sheets

Related U.S. Application Data

(60) Provisional application No. 62/118,032, filed on Feb. 19, 2015.

(51) Int. Cl.
*A47J 31/36* (2006.01)
*A47J 31/40* (2006.01)
*A47J 31/32* (2006.01)
*A47J 31/60* (2006.01)

(58) Field of Classification Search
CPC .......... F04B 13/02; F04B 17/03; F04B 19/22; F04B 23/02; F04B 43/02; F04B 49/22; F04B 53/10; F04B 53/1037; F04B 53/143; F04B 53/162; F04B 9/109; F04B 9/115
USPC ......... 99/279, 280, 291, 293, 298, 295, 297, 99/323; 426/52, 438, 496, 549, 61, 615, 426/618; 220/203.02, 203.29, 553; 210/136, 143, 257.1, 416.1, 683, 767; 222/386.5, 95, 389, 105, 153.04, 153.09, 222/395, 399, 400.7, 484, 1, 107, 145.6, 222/189.06, 195, 209, 212, 23, 255, 263, 222/266, 267, 278, 40, 438, 444, 52, 528, 222/94

See application file for complete search history.

(56) References Cited

U.S. PATENT DOCUMENTS

| | | | |
|---|---|---|---|
| 4,633,771 A * | 1/1987 | Anderl | A47J 31/40 99/280 |
| 4,829,889 A | 5/1989 | Takeuchi et al. | |
| 5,393,540 A * | 2/1995 | Bunn | A47J 31/002 426/231 |
| 6,272,973 B1 * | 8/2001 | Fukushima | A47J 31/56 99/280 |
| 2008/0017042 A1 | 1/2008 | Almblad et al. | |
| 2013/0064034 A1 * | 3/2013 | Almblad | A23G 9/30 366/205 |
| 2014/0106042 A1 | 4/2014 | Noslet et al. | |

OTHER PUBLICATIONS

European Search Report Application No. 16753143.3, 14 pages dated Oct. 31, 2018.
International Preliminary Report for PCT/US2016/018675 dated Aug. 22, 2017.

* cited by examiner

AUTOMATED COFFEE AND TEA MAKER AND AUTOMATED PRESSURE BREWER

PRIORITY INFORMATION

The present application is a continuation application of PCT patent application Ser. No. PCT/US2016/018675 and claims priority, under 35 U.S.C. § 120, from PCT patent application Ser. No. PCT/US2016/018675, filed on Feb. 19, 2016, said PCT patent application Ser. No. PCT/US2016/018675, filed on Feb. 19, 2016, claiming priority, 35 U.S.C. § 119(e), from U.S. Provisional Patent Application, Ser. No. 62/118,032, filed on Feb. 19, 2015. The entire content of PCT patent application No. PCT/US2016/018675, filed on Feb. 19, 2016, is hereby incorporated by reference.

The present application claims priority, under 35 USC §120, from PCT Patent Application Number PCT/US2016/018675, filed on Feb. 19, 2016.

The present application claims priority, under 35 U.S.C. §119(e), from U.S. Provisional Patent Application, Ser. No. 62/118,032, filed on Feb. 19, 2015. The entire content of U.S. Provisional Patent Application, Ser. No. 62/118,032, filed on Feb. 19, 2015, is hereby incorporated by reference.

BACKGROUND

Some conventional brewing systems heat a liquid; e.g., water; to a predetermined temperature and cause the heated liquid to pass over the extraction material; e.g., coffee grounds or tea leaves; and through a filter to prevent the extraction material from being served. The filtered brewed liquid is conventionally stored in a carafe or thermos.

In these conventional coffee brewing systems, coffee is not properly made. The proper way to make coffee is to fully immerse the coffee grounds in water and remove all the grounds at the same time about 3 to 4 minutes later. If the coffee grounds are removed too early, there will be "under extraction," and if the coffee grounds are left too long, there will be "over extraction." In other words, the first drops exiting the filter are under brewed, while the last drops are over brewed.

Conventional immersion brewing systems; such as expresso systems, saturate coffee grounds with hot water under pressure of about 9 bars or about 130 psi.

In the conventional expresso systems, the pressure speeds up the infusion process to about 20 to 30 seconds, and a small amount of water is used. The filter that holds the coffee is small and made of metal to withstand the 130 psi. The conventional expresso machine automatically dispenses 2 to 3 ounces of expresso. Thereafter, the filter chamber is cleaned.

Therefore, it is desirable to provide an immersion brewing system that automatically immerses the extraction material (coffee grounds or tea leaves) in properly heated liquid to produce brewed liquid using a reduced infusion time.

Moreover, it is desirable to provide an immersion brewing system that automatically immerses the extraction material (coffee grounds or tea leaves) in properly heated liquid to produce brewed liquid using a reduced infusion time, which provides automatic dispensing of the brewed liquid.

Furthermore, it is desirable to provide an immersion brewing system that automatically immerses the extraction material (coffee grounds or tea leaves) in properly heated liquid to produce brewed liquid using a reduced infusion time, which provides automatic dispensing of the brewed liquid and automatically cleans the extraction material from the brewing chamber after dispensing the brewed liquid.

BRIEF DESCRIPTION OF THE DRAWING

The drawings are only for purposes of illustrating various embodiments and are not to be construed as limiting, wherein.

DETAILED DESCRIPTION OF THE DRAWINGS

Figure 1:
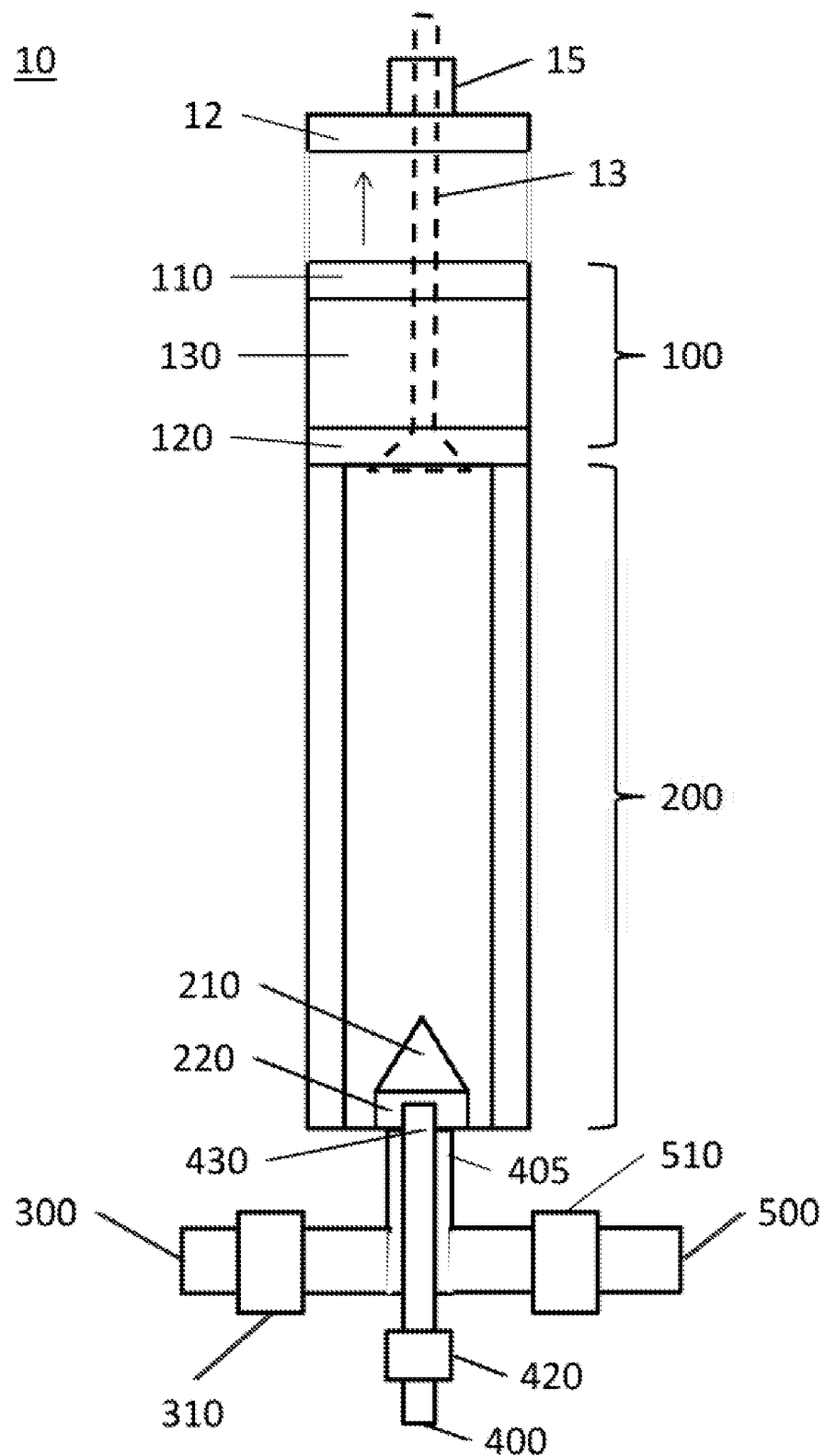
FIG. 1 illustrates a full immersion brewing component.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As illustrated in FIG. 1, a full immersion brewing component 10 includes an extraction material chamber 100 and a full immersion brewing chamber 200. The full immersion brewing component 10 includes a cap 12 that can be raised, manually or automatically, off a top 110. The cap 12 includes a valve mechanism 15 that allows the introduction of heated liquid and/or pressurized air into the full immersion brewing chamber 200. The cap 12 also includes an extraction material chamber valve mechanism 13.

The top 110 of the extraction material chamber 100 includes an opening to receive extraction material (coffee grounds or tea leaves) as well as heated liquid (water). The extraction material chamber 100 also includes a bottom 120. The bottom 120 includes an opening to introduce extraction material (coffee grounds or tea leaves) as well as heated liquid (water) to the full immersion brewing chamber 200. As illustrated in FIG. 1, the extraction material chamber valve mechanism 13 is seated against the opening in the bottom 120 to prevent the introduction or any material into the full immersion brewing chamber 200.

At the end of the full immersion brewing chamber 200, opposite the bottom 120, the full immersion brewing component 10 includes a dispenser/drain/cleaning mechanism. The dispenser/drain/cleaning mechanism includes a dispenser/drain valve mechanism having a top section 210 and a filter 220. Within the volume, created by the top section 210 and the filter 220, a cleaning mechanism 430 is located.

It is noted that the filter 220 be at least a seventy micron filter.

The dispenser/drain/cleaning mechanism further includes an opening 405 in the full immersion brewing chamber 200 to allow the dispensing of the brewed liquid or the draining of other liquids and undesired material.

The opening 405 in the full immersion brewing chamber 200 is connected to a drain system through drain valve 310 and drain conduit 300. The opening 405 in the full immersion brewing chamber 200 is also connected to a dispensing system through dispensing valve 510 and dispensing conduit 500.

The cleaning mechanism 430 is a cleaning solution system through cleaning valve 410 and cleaning solution conduit 400.

Figure 2:
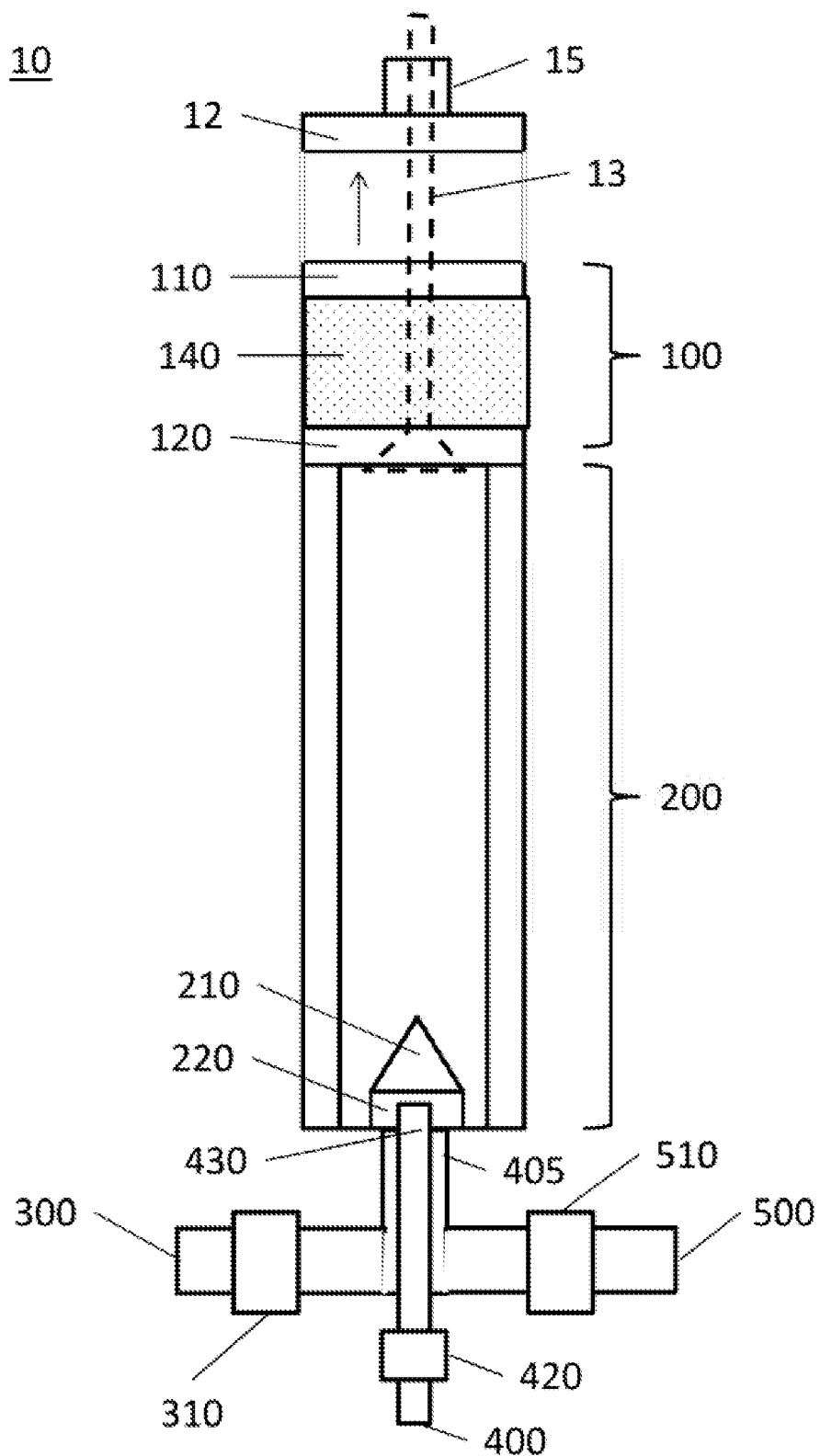
FIG. 2 illustrates the full immersion brewing component of FIG. 1 with extraction material loaded in a pre-wet chamber.

As illustrated in FIG. 2, an extraction material 140 has been introduced into the extraction material chamber 100. As further illustrated in FIG. 2, the extraction material chamber valve mechanism 13 is seated against the opening in the bottom 120 to prevent the introduction of the extraction material 140 into the full immersion brewing chamber 200.

Figure 3:
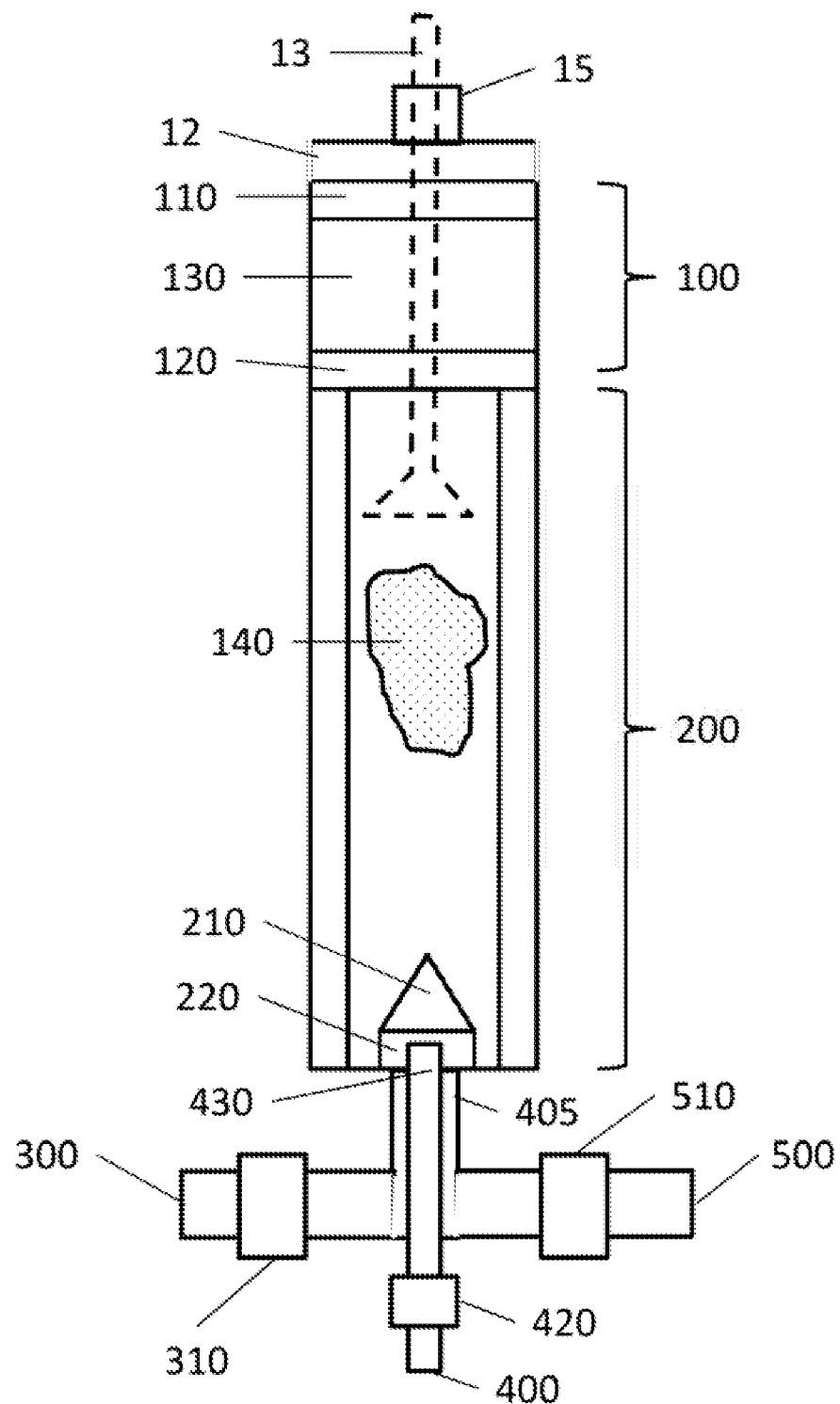
FIG. 3 illustrates the full immersion brewing component of FIG. 1 with extraction material being loaded in a brewing chamber.

As illustrated in FIG. 3, the cap 12 is lowered, manually or automatically, towards the top 110. By lowering the cap 12, the extraction material chamber valve mechanism 13 becomes unseated from the opening in the bottom 120 to allow the introduction of the extraction material 140 into the full immersion brewing chamber 200.

Figure 4:
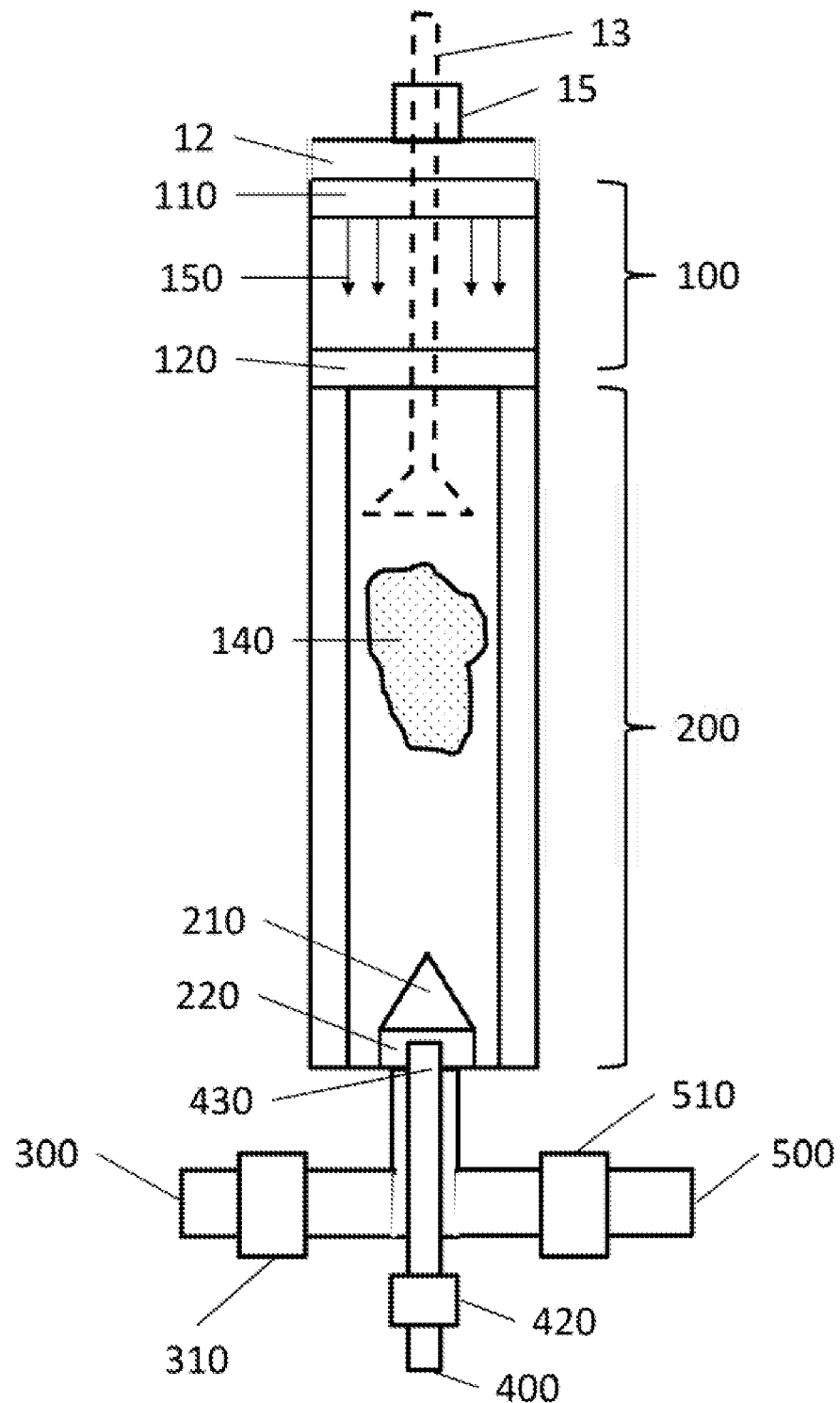
FIG. 4 illustrates the full immersion brewing component of FIG. 1 with extraction material and heated liquid being loaded in a brewing chamber.

As illustrated in FIG. 4, the cap 12, through the valve mechanism 15, introduces heated liquid (water) 150 into the extraction material chamber 100 to rinse any residual extraction material 140 into the full immersion brewing chamber 200.

Figure 5:
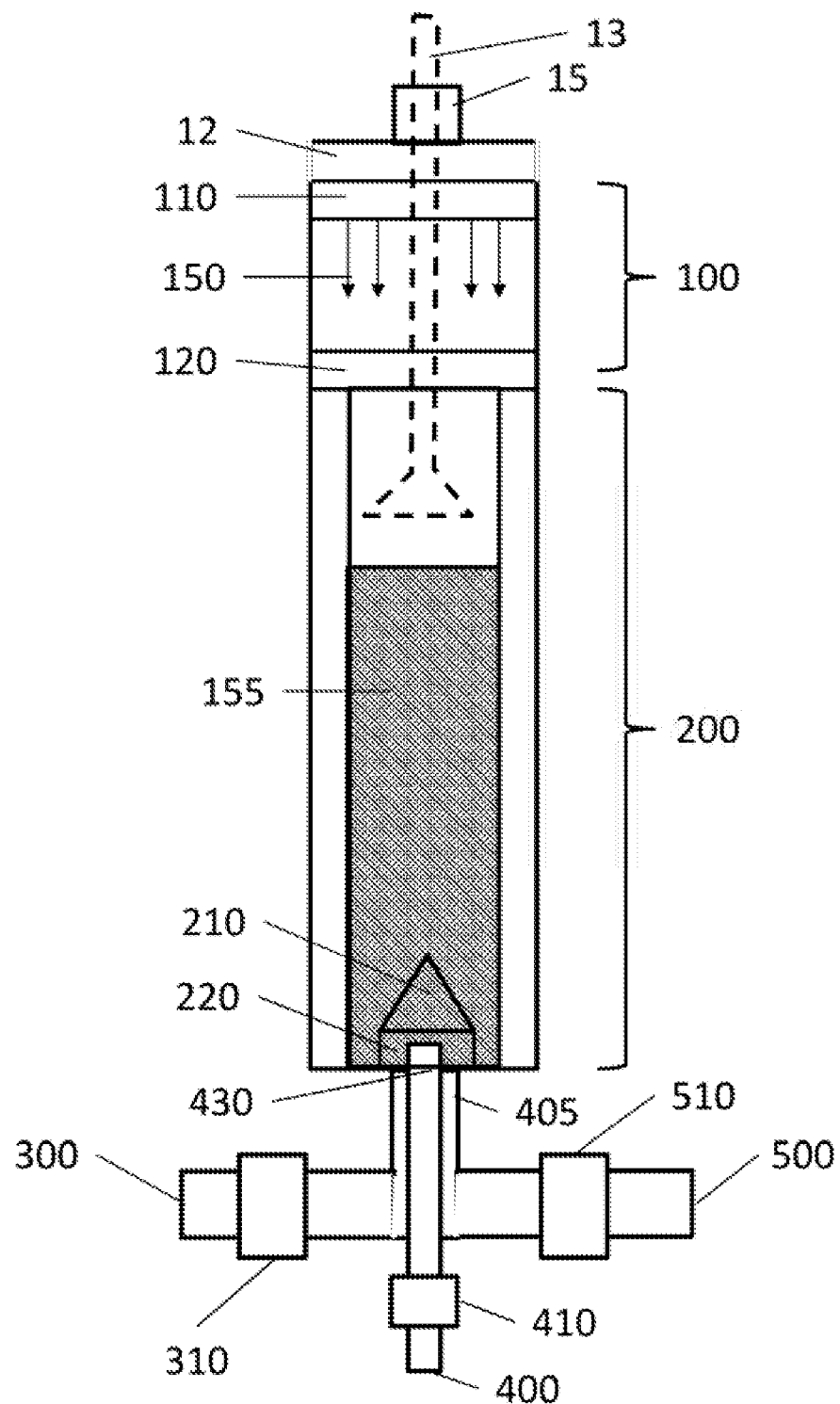
FIG. 5 illustrates the full immersion brewing component of FIG. 1 with heated liquid being loaded in a brewing chamber.

As illustrated in FIG. 5, all the heated liquid 150 is introduced into the full immersion brewing chamber 200 to create the brewed liquid 155.

Figure 16:
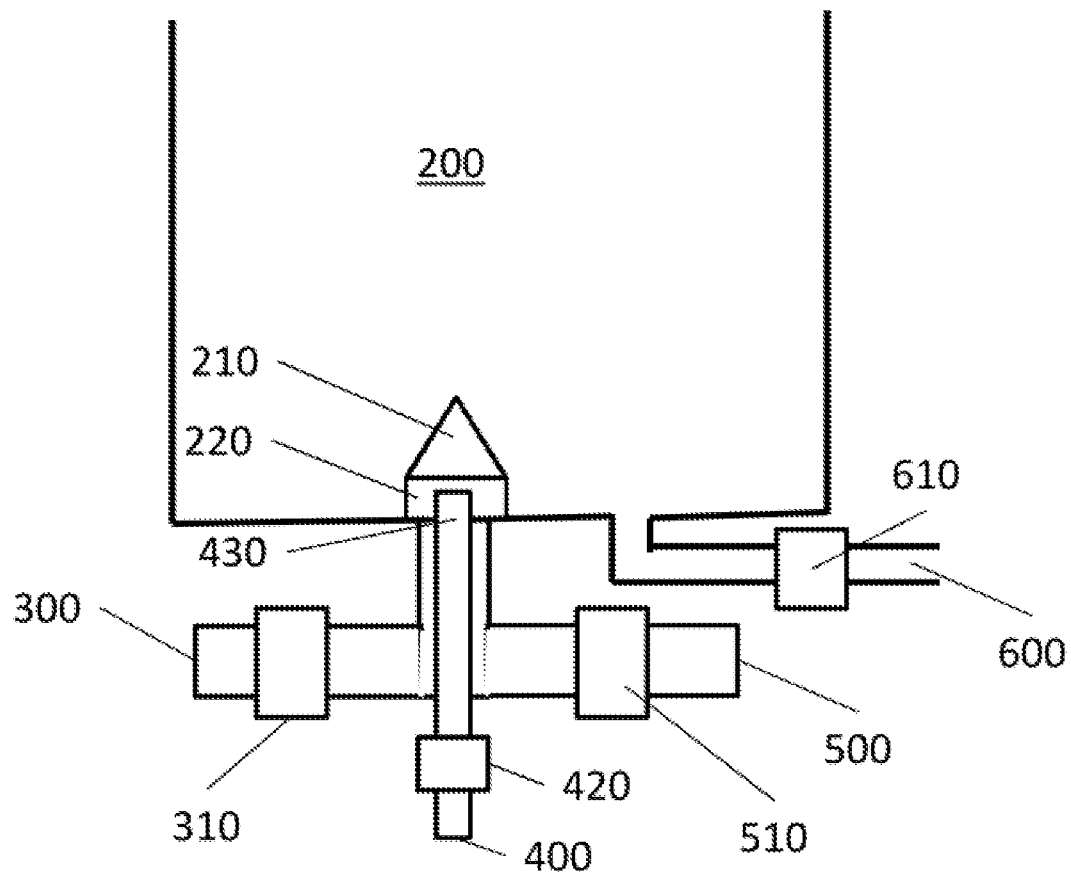
FIG. 16 illustrates an example of a dispensing/draining/cleaning mechanism and a heat liquid loading mechanism for a full immersion brewing component.

It is further noted that the extraction material chamber valve mechanism 13 may operate independently of the cap 12. In this embodiment, the remaining heated liquid is introduced into the full immersion brewing chamber 200, as illustrated in FIG. 16, and the extraction material chamber valve mechanism 13 is seated against the opening in the bottom 120 to prevent any material from exiting the full immersion brewing chamber 200.

Figure 6:
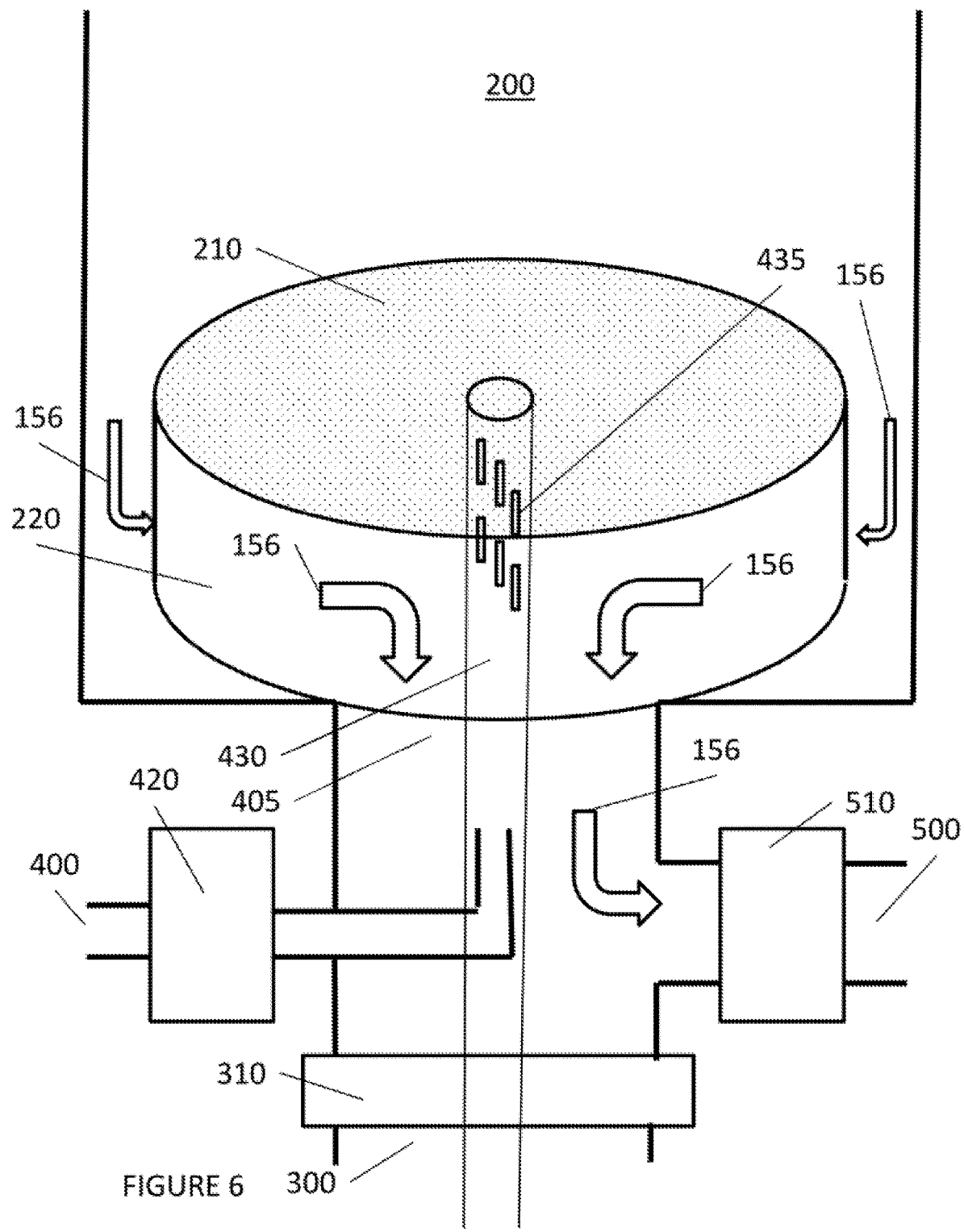
FIG. 6 illustrates an example of the brewed liquid being dispensed from the brewing chamber.

As illustrated in FIG. 6, brewed liquid is dispensed from the full immersion brewing chamber 200, through the filter 220, as illustrated by arrows 156. The filter 220 retains the extraction material 140 in the full immersion brewing chamber 200 during dispensing operations. After the brewed liquid passes the filter 220, the brewed liquid flows through the opening 405, as illustrated by arrows 156, and out through the dispensing valve mechanism 510 to the dispensing conduit 500, as illustrated by arrow 156.

Figure 7:
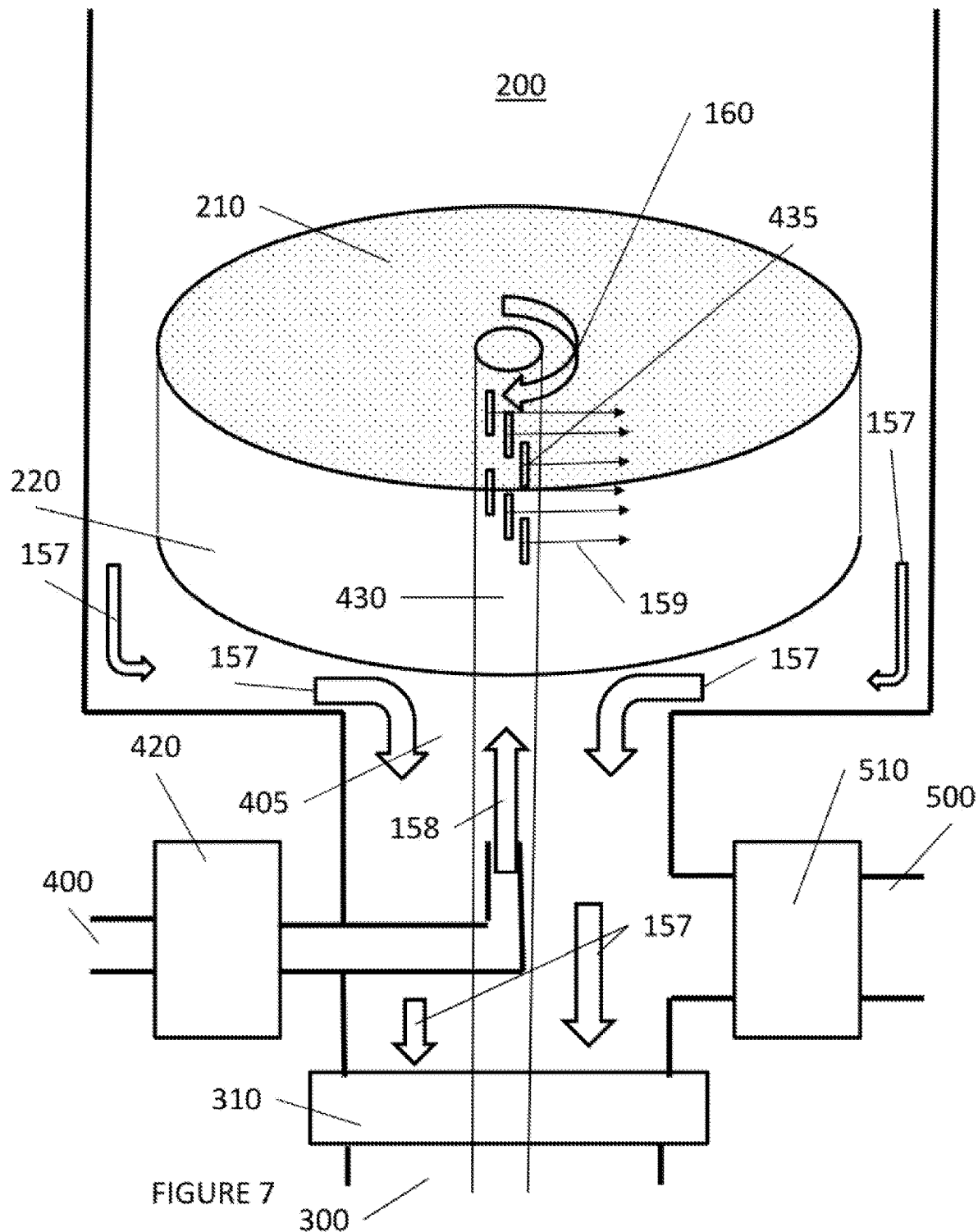
FIG. 7 illustrates an example of the brewing chamber being cleaned of the extraction material.

As illustrated in FIG. 7, after the brewed liquid has been dispensed from the full immersion brewing chamber 200, the dispenser/drain valve mechanism is unseated from the bottom of the full immersion brewing chamber 200 to allow used extraction material to pass to the opening 405, without going through the filter 220.

As further illustrated in FIG. 7, a pressurized cleaning solution (heated water) is received from the cleaning solution conduit 400 through the cleaning valve 410 and routed to cleaning mechanism 430, as illustrated by arrow 158. The pressurized cleaning solution (heated water) 159 is jetted, through angled slots 435, towards the inside surface of the filter 220 to dislodge any extraction material located on the filter 220. The jetting of the pressurized cleaning solution 159 causes the cleaning mechanism 430 to rotate, as illustrated by arrow 160. The rotating of the cleaning mechanism 430 enables the cleaning of the entire filter 220.

The used extraction material is rinsed (washed) from the full immersion brewing chamber 200 through the opening 405, as illustrated by arrows 157. The used extraction material then flows out through the drain valve mechanism 310 to the drain conduit 300, as illustrated by arrow 157.

Figure 8:
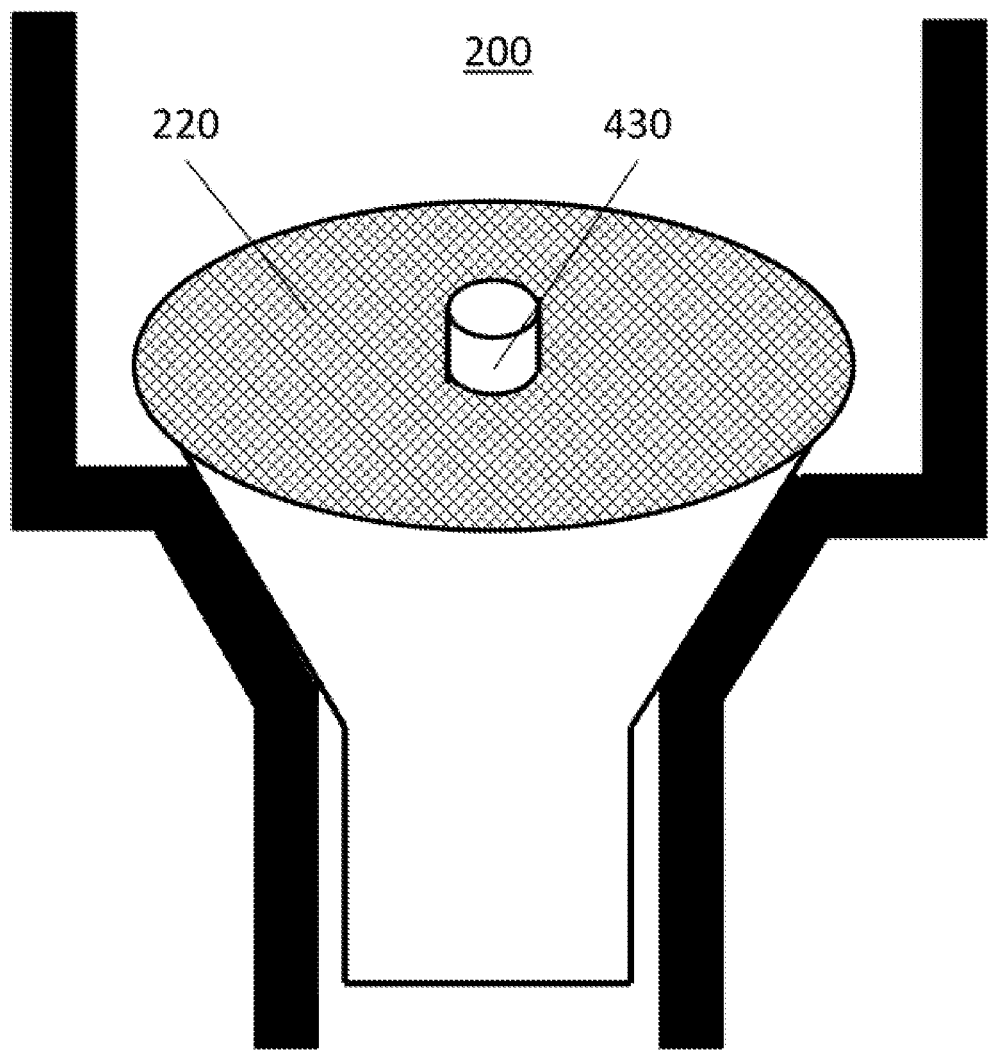
FIG. 8 illustrates another example of the brewed liquid being dispensed from the brewing chamber.

FIG. 8 illustrates another embodiment of the dispenser/drain valve mechanism for the full immersion brewing chamber 200. As illustrated in FIG. 8, the dispenser/drain valve mechanism is seated against an opening in the full immersion brewing chamber 200. The dispenser/drain valve mechanism includes a substantially flat filter 220 and a cleaning mechanism 430 located outside the volume created by the dispenser/drain valve mechanism.

In this situation, as illustrated in FIG. 8, the brewed liquid passes through filter 220 to the dispensing mechanism (not shown).

Figure 9:
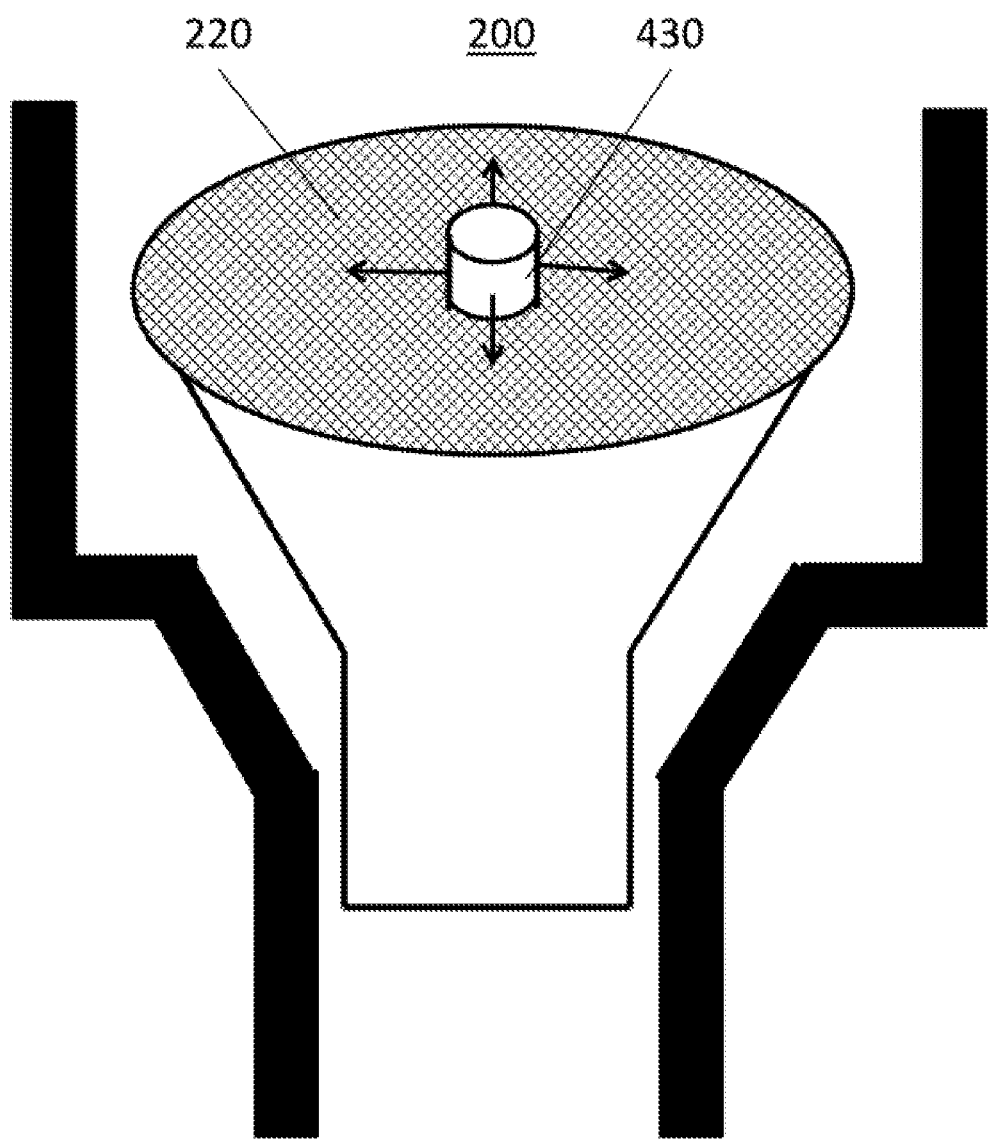
FIG. 9 illustrates another example of the brewing chamber being cleaned of the extraction material.

As illustrated in FIG. 9, the dispenser/drain valve mechanism is unseated from the opening in the full immersion brewing chamber 200. The dispenser/drain valve mechanism includes a substantially flat filter 220 and a cleaning mechanism 430 located outside the volume created by the dispenser/drain valve mechanism.

In this situation, as illustrated in FIG. 9, the a pressurized cleaning liquid is sprayed over the filter 220 remove the used extraction material so that the used extraction material can flow from the full immersion brewing chamber 200.

Figure 10:
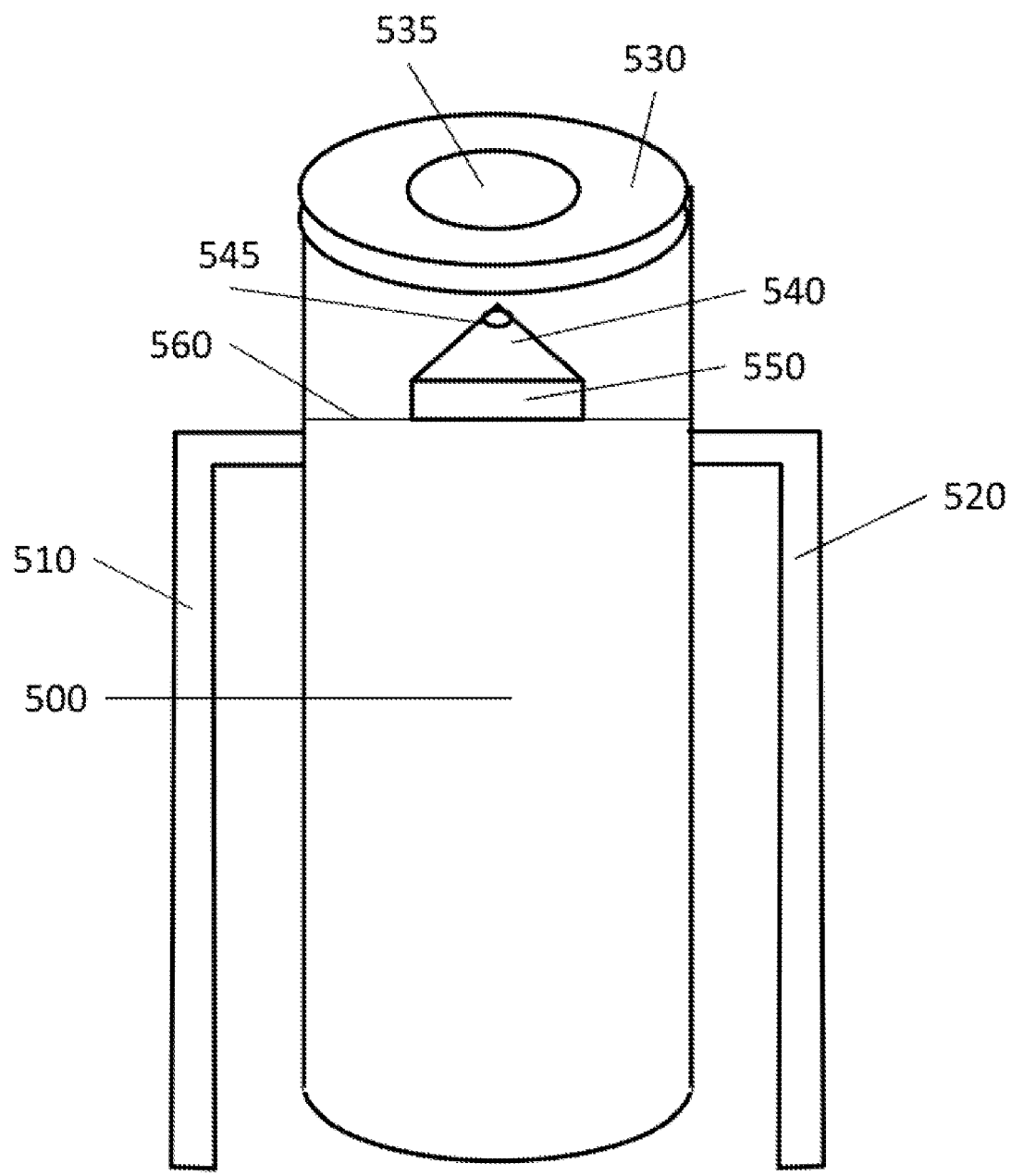
FIG. 10 is another example of a full immersion brewing component.

FIG. 10 illustrates another embodiment of a full immersion brewing system. As illustrated in FIG. 10, the full immersion brewing system includes a full immersion brewing chamber 500. The full immersion brewing system also includes support 510 and support 520. Support 510 also allows the introduction of pressurized air into the full immersion brewing chamber 500, and support 520 allows the introduction of heated liquid into the full immersion brewing chamber 500.

The full immersion brewing system includes a gravity stop 560 within the full immersion brewing chamber 500 and a floating valve that includes a filter screen 550, a seating section 540, and a mechanism for dispensing brewed liquid 545. The gravity stop 560 prevents the floating valve from going to a bottom of the full immersion brewing chamber 500.

As illustrated in FIG. 10, the full immersion brewing system includes a top 530 with an opening 535. It is noted that the top 530 may be removable from the full immersion brewing chamber 500.

Figure 11:
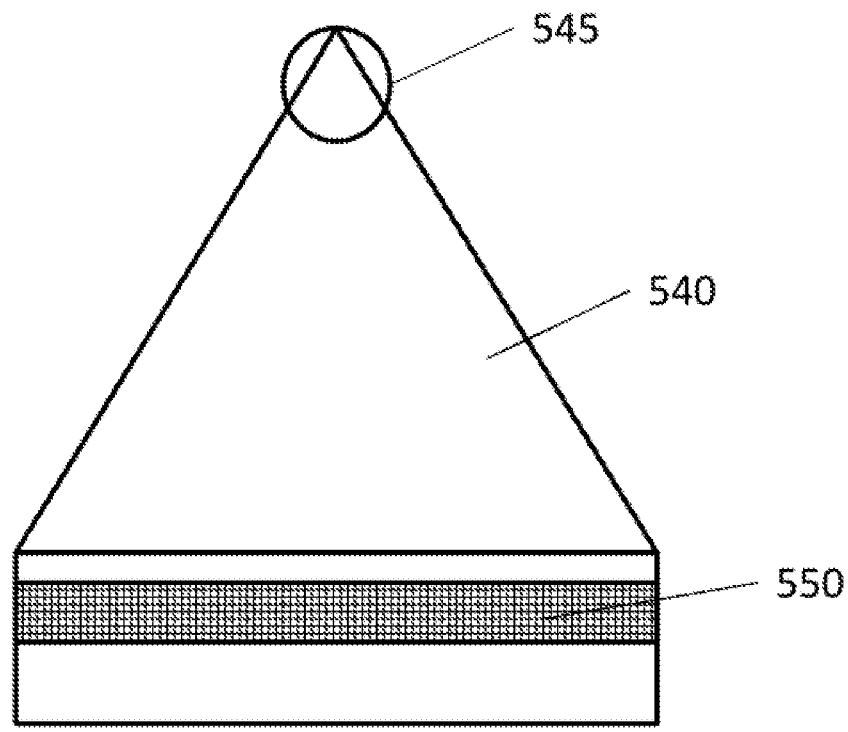
FIG. 11 illustrates an example of a floating valve with a extraction material filter or screen for the full immersion brewing component of FIG. 10.

As illustrated in FIG. 11, the floating valve includes a filter screen 550 and a seating section 540.

Figure 12:
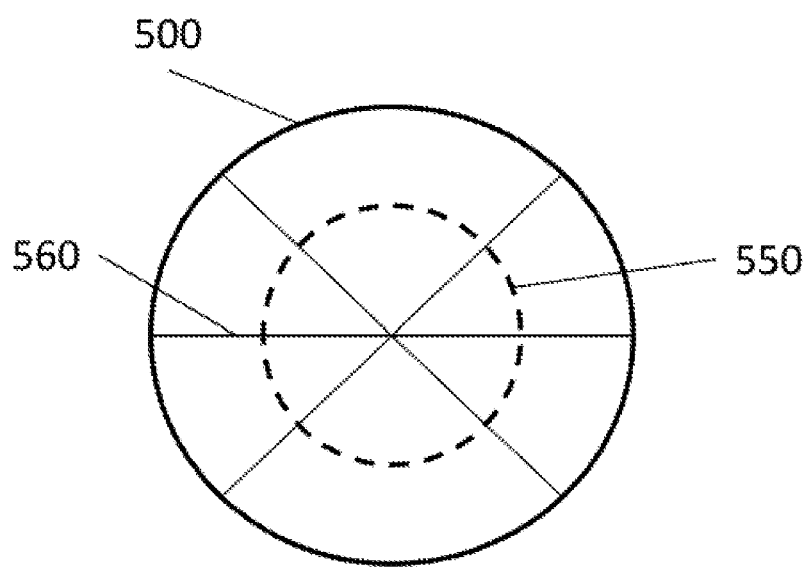
FIG. 12 illustrates an example of a gravity stop for the full immersion brewing component of FIG. 10.

FIG. 12 is a top view of the full immersion brewing chamber 500, wherein the floating valve is located on the gravity stop 560. The gravity stop 560 is constructed to hold the floating valve from falling to the bottom of the full immersion brewing chamber 500, but also allows extraction material to pass through it.

Figure 13:
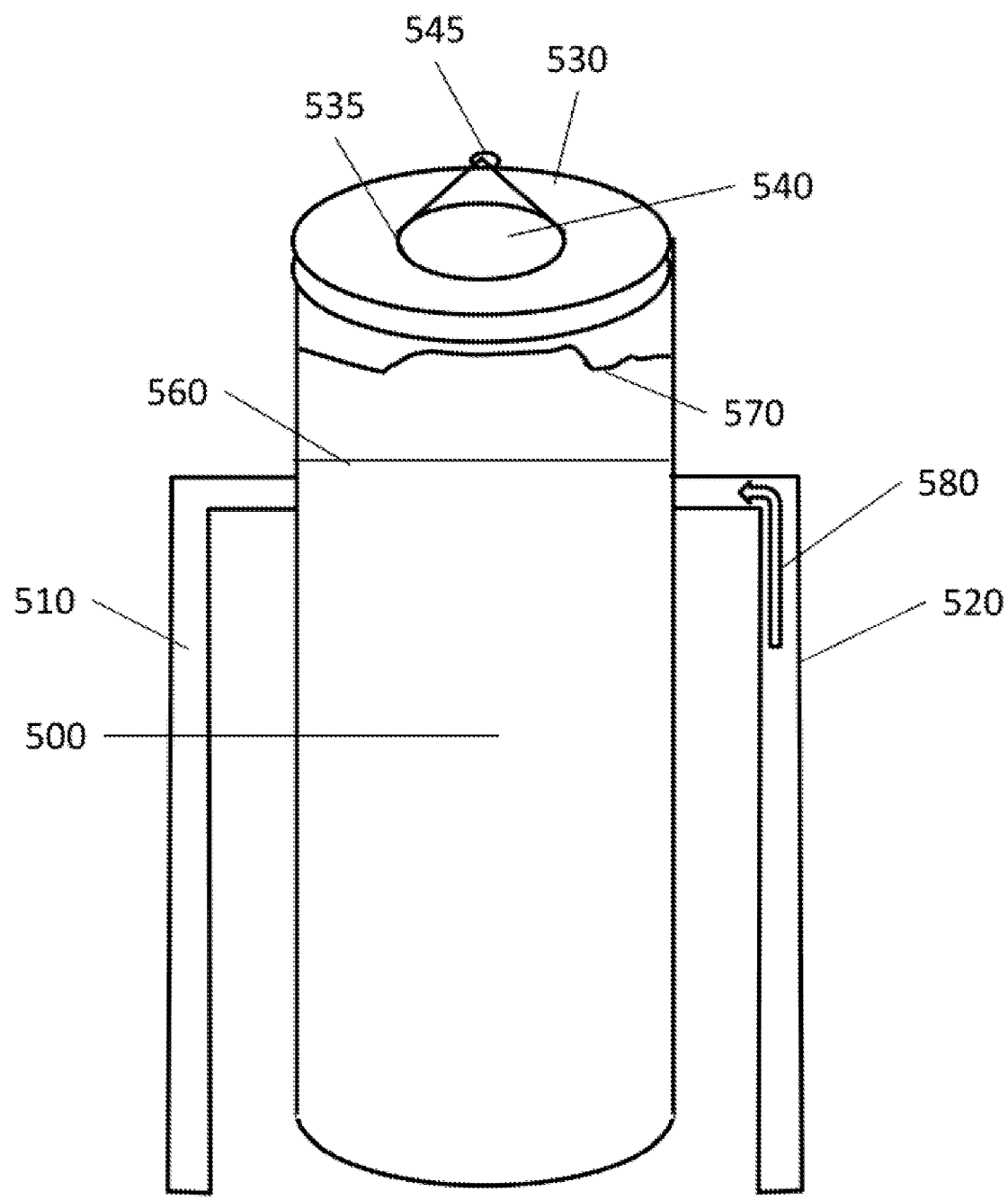
FIG. 13 illustrates loading the full immersion brewing component of FIG. 10 with a heated liquid.

As illustrated in FIG. 13, after extraction material is introduced into the full immersion brewing chamber 500, heated liquid (water) is introduced to the full immersion brewing chamber 500, via support 520 (see arrow 580). As the brewing liquid 570 rises in the full immersion brewing chamber 500, the floating valve rises and the seating section 540 becomes seated against the opening 535.

The mechanism for dispensing brewed liquid 545 is in a first position when the full immersion brewing system is in an upright position, as illustrated in FIG. 13. This first position allows the floating valve to remain buoyant and float to the top of the full immersion brewing chamber 500 so that the seating section 540 seats against the opening 535 of the full immersion brewing chamber 500.

Figure 14:
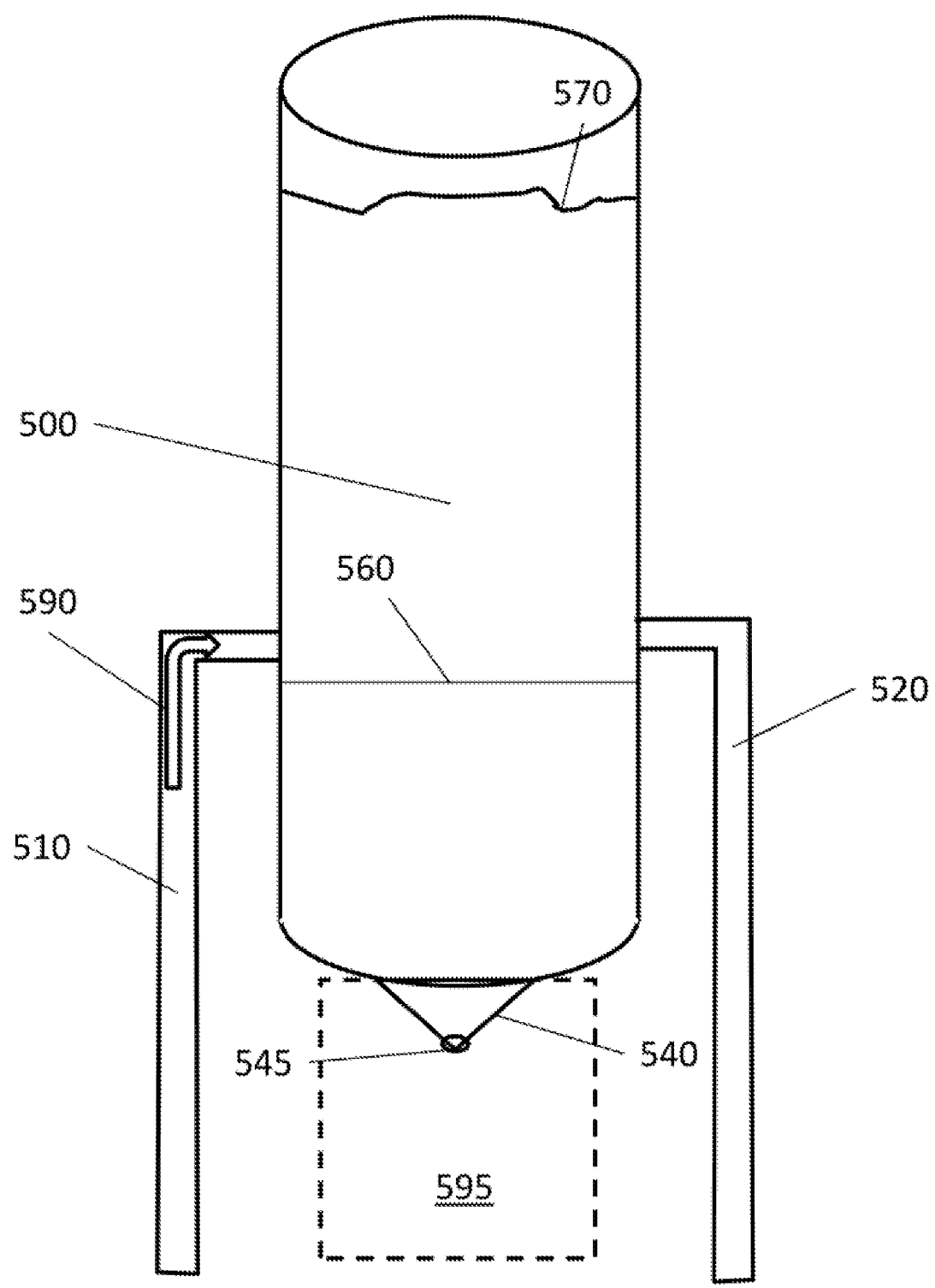
FIG. 14 illustrates loading the full immersion brewing component of FIG. 10 with pressurized air while in a dispensing position.

As illustrated in FIG. 14, the full immersion brewing chamber 500 is rotated about the supports while the floating valve remains seated against the opening 535. Pressurized air is introduced to the full immersion brewing chamber 500, via support 510 (see arrow 590).

The mechanism for dispensing brewed liquid 545 is in a second position when the full immersion brewing system is in a downward position, as illustrated in FIG. 14. This second position allows the seating section 540 of the floating valve to remain seated against the opening 535 of the full immersion brewing chamber 500.

The mechanism for dispensing brewed liquid 545, when the full immersion brewing system is in a downward position as illustrated in FIG. 14, may optionally engage a dispensing device 595 that operationally interacts with the mechanism for dispensing brewed liquid 545 t enable the dispensing of the brewed liquid from the full immersion brewing chamber 500.

Upon dispensing the brewed liquid, the seating section 540 of the floating valve may be unseated from the opening 535 of the full immersion brewing chamber 500 to enable the removal or cleaning of the extraction material from the full immersion brewing chamber 500.

It is noted that removal of the top 530 may facilitate the cleaning process.

Figure 15:
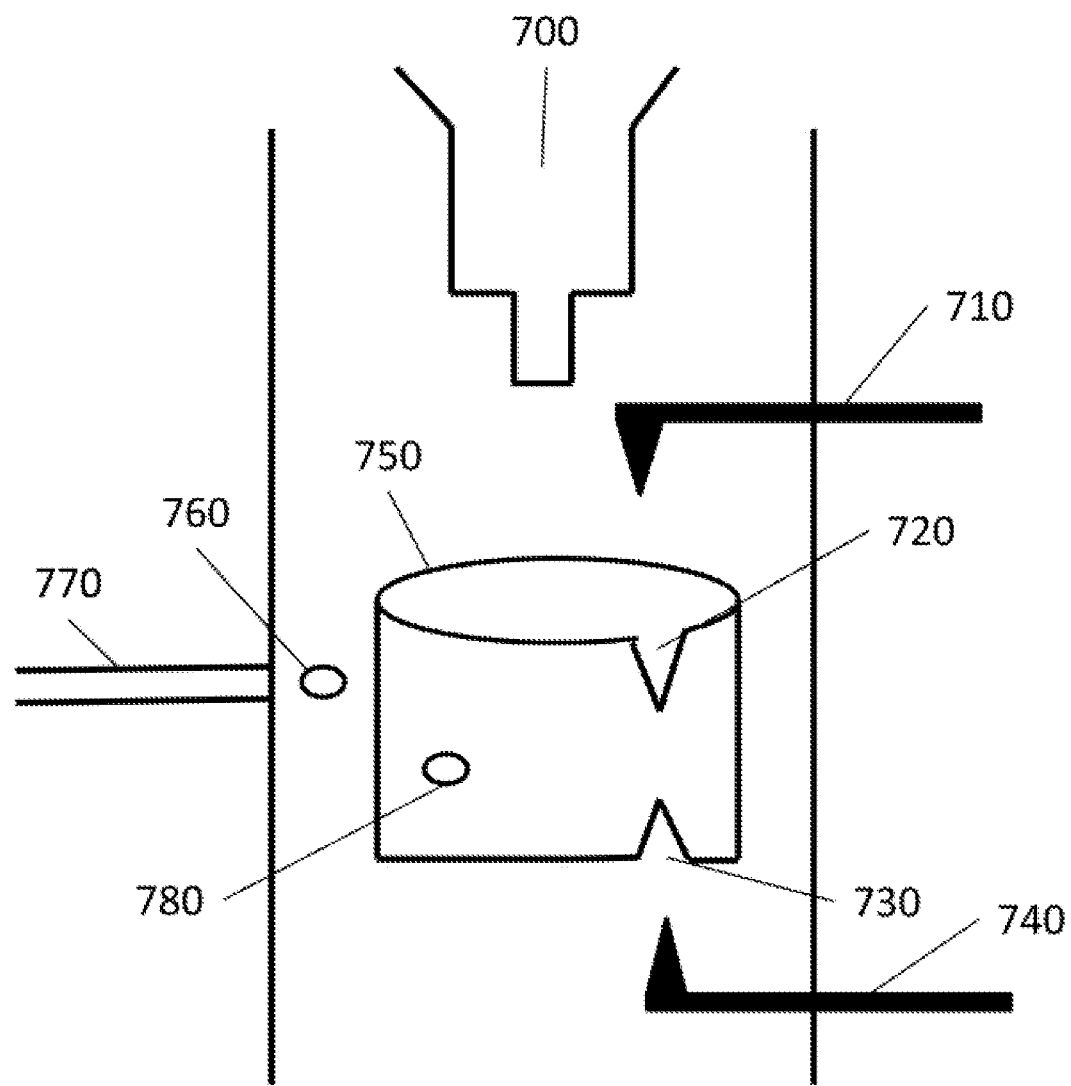
FIG. 15 illustrates an example of a dispensing/draining mechanism for a full immersion brewing component.

FIG. 15 illustrates a drain/dispensing valve mechanism having a dispensing valve mechanism 700.

As illustrated in FIG. 15, when the dispensing mechanism 750 of the drain/dispensing valve is down, a bottom probe or guide 740 engages with a notch 730 in the dispensing mechanism 750 to rotate the dispensing mechanism 750.

The rotation of the dispensing mechanism 750 allows a dispense line exit 750 to line up with the dispensing mechanism exit hole 780. When the dispense line exit 750 lines up with the dispensing mechanism exit hole 780, brewed liquid can be dispensed through a dispensing line 770. It is noted that the dispensing line 770 may be flexible.

When the dispensing mechanism 750 is moved up into a wash position, the dispensing mechanism 750 engages a top probe or guide 710 that engages with a notch 720 in the dispensing mechanism 750 to rotate the dispensing mechanism 750. The rotation of the dispensing mechanism 750 causes the dispense line exit 750 to no longer line up with the dispensing mechanism exit hole 780.

As illustrated in FIG. 16, the full immersion brewing chamber 200 includes a dispensing mechanism that has a top section 210 and a filter 220. The filter 220 retains the extraction material 140 in the full immersion brewing chamber 200 during dispensing operations. After the brewed liquid passes the filter 220, the brewed liquid flows out through a dispensing valve mechanism 510 to the dispensing conduit 500.

After the brewed liquid has been dispensed from the full immersion brewing chamber 200, the dispensing mechanism is unseated from the bottom of the full immersion brewing chamber 200 to allow used extraction material to pass out of the full immersion brewing chamber 200 without going through the filter 220.

A pressurized cleaning solution (heated water) is received from the cleaning solution conduit 400 through the cleaning valve 410 and routed to cleaning mechanism 430. The pressurized cleaning solution (heated water) is jetted towards the filter 220 to dislodge any used extraction material located on the filter 220.

The used extraction material is rinsed (washed) from the full immersion brewing chamber 200 and then flows out through the drain valve mechanism 310 to the drain conduit 300.

To infuse the extraction material in the heated liquid, the heated liquid, from a heated liquid conduit 600, is introduced into the full immersion brewing chamber 200 through heated liquid valve 610. It is noted that in this embodiment, the heated liquid is introduced into the full immersion brewing chamber 200 at the bottom of the full immersion brewing chamber 200; however, the heated liquid can be introduced may be introduced into the full immersion brewing chamber 200 at any location.

Figure 17:
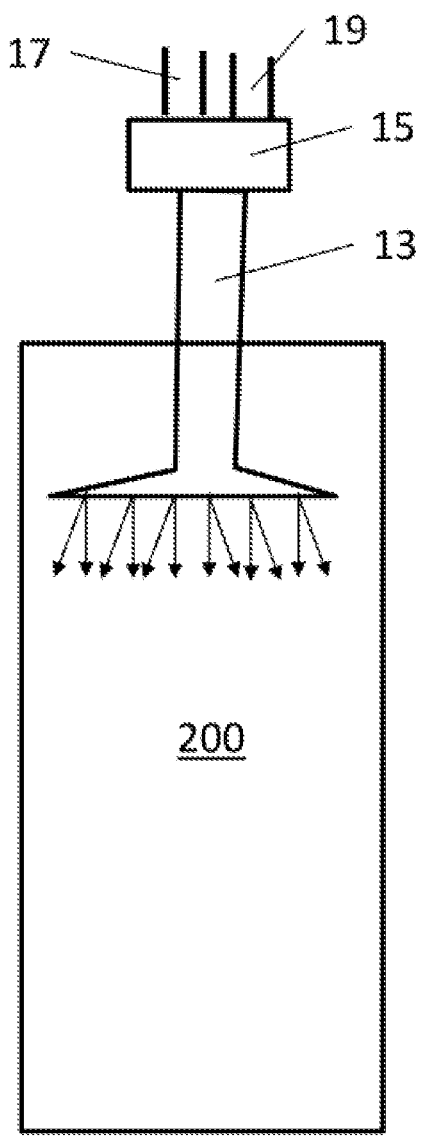
FIG. 17 illustrates an example of an extraction material loading mechanism for a full immersion brewing component.

FIG. 17 illustrates a full immersion brewing chamber 200 having an extraction material chamber valve mechanism 13.

As illustrated in FIG. 17, the extraction material chamber valve mechanism 13 is constructed to introduce heated liquid into the full immersion brewing chamber 200 received from a heated liquid conduit 17. The extraction material chamber valve mechanism 13 is also constructed to introduce pressurized air into the full immersion brewing chamber 200 received from air conduit 19. Valve mechanism 15 allows the introduction of heated liquid and/or pressurized air into the full immersion brewing chamber 200 through the extraction material chamber valve mechanism 13.

Figure 18:
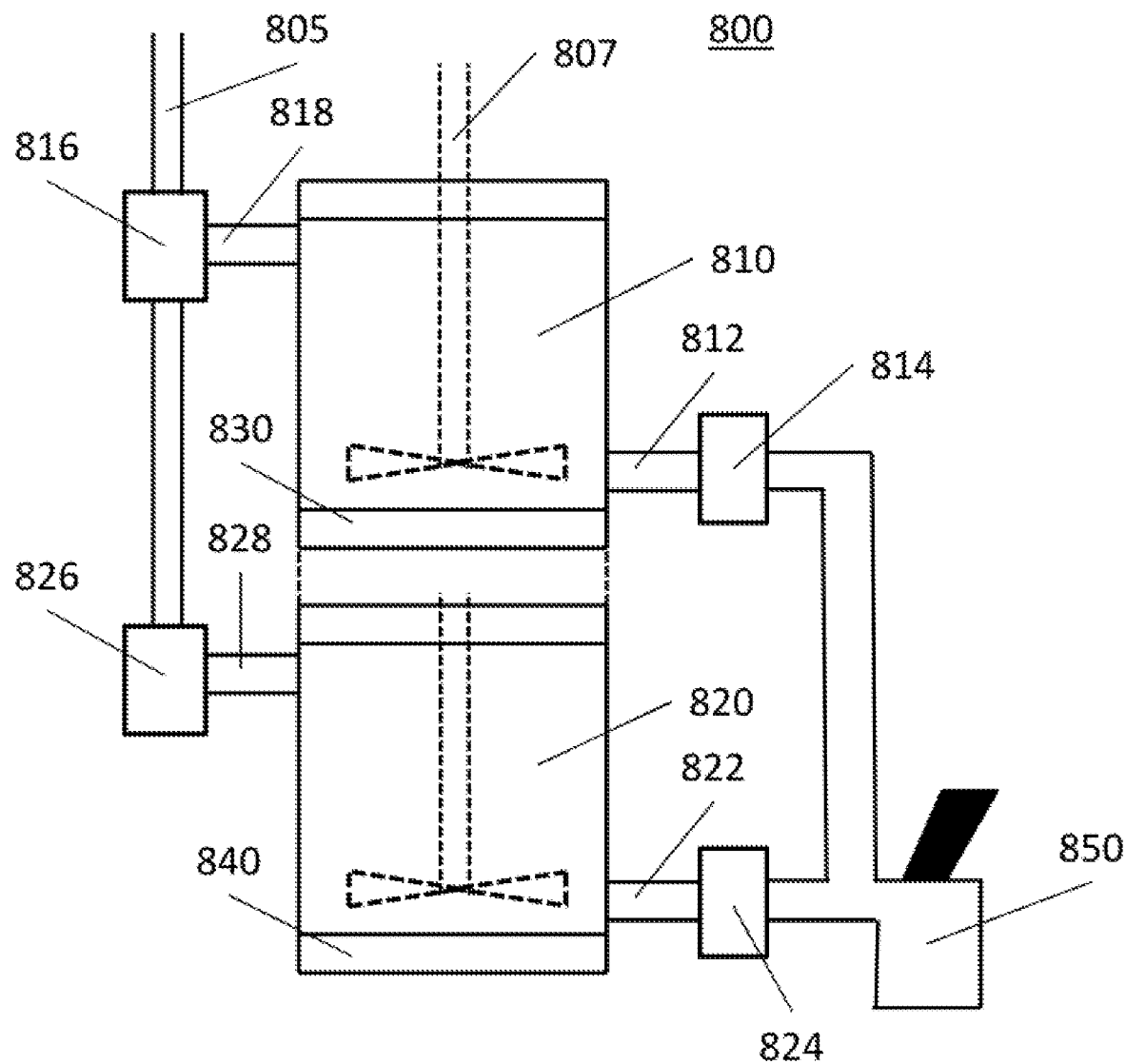
FIG. 18 illustrates an example of a double stack brewed liquid accumulator/chamber.

FIG. 18 illustrates a double stack brewed liquid accumulator/storage device 800. The double stack brewed liquid accumulator/storage device 800 includes a first brewed liquid accumulator/storage chamber 810 and a second brewed liquid accumulator/storage chamber 820.

The first brewed liquid accumulator/storage chamber 810 is filled with brewed liquid through brew conduit 805, first brew valve 816, and first brew conduit 818. The second brewed liquid accumulator/storage chamber 820 is filled with brewed liquid through brew conduit 805, second brew valve 826, and second brew conduit 828.

The first brewed liquid accumulator/storage chamber 810 includes a heater 830, and second brewed liquid accumulator/storage chamber 820 includes a heater 840.

The brewed liquid is dispensed from the first brewed liquid accumulator/storage chamber 810 through first dispensing conduit 812, first dispensing valve 814, and dispensing mechanism 850. The brewed liquid is dispensed from the second brewed liquid accumulator/storage chamber 820 through second dispensing conduit 822, second dispensing valve 824, and dispensing mechanism 850.

The first brewed liquid accumulator/storage chamber 810 and the second brewed liquid accumulator/storage chamber 820 may include a fill sensor (not shown) that senses if the brewed liquid accumulator/storage chamber is empty. If the brewed liquid accumulator/storage chamber is empty, the brewed liquid accumulator/storage chamber can be automatically refilled using the appropriate valves and conduits described above.

It is also noted that when the fill sensor (not shown) senses that the brewed liquid accumulator/storage chamber is empty, the emptied brewed liquid accumulator/storage chamber can be cleaned (residual brewed liquid rinsed from the chamber). The cleaning can be automatically realized with the appropriate conduits and valves in a similar manner described above to filling the chambers with brewed liquid.

The brewed liquid accumulator/storage chamber may also include an optional stirring/mixing device 807 to circulate the brewed liquid and/or assist in rinsing/cleaning the chamber.

Figure 19:
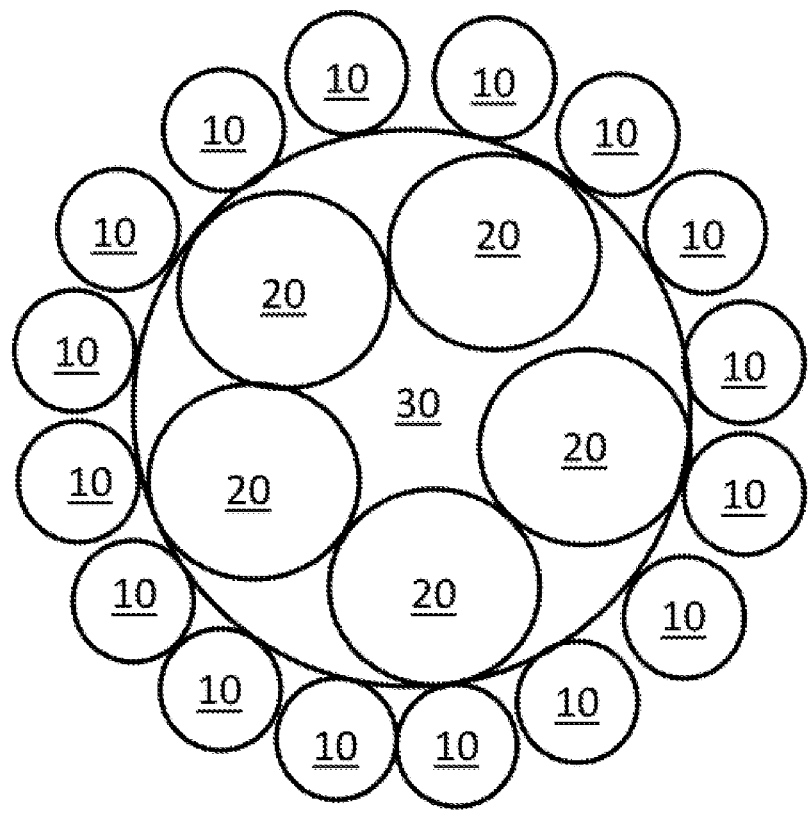
FIG. 19 illustrates a top view of a full immersion brewing system for multiple brewed liquids.

FIG. 19 illustrates a top view of a full immersion brewing system for multiple brewed liquids.

As illustrated in FIG. 19, multiple extraction material storage containers 20 are position on a carousel 30 to allow the rotation of multiple extraction material storage containers 20. The extraction material storage container 20 may contain unprocessed/ungrounded extraction material or processed/grounded extraction material. Each extraction material storage container 20 may contain a distinct extraction material.

When a full immersion brewing device 10 (as described with respect to FIGS. 1-9) is ready for brewing, an appropriate extraction material storage container 20 is rotated to engage the full immersion brewing device 10 so as to enable the loading of the full immersion brewing device 10 with extraction material from the extraction material storage container 20.

It is noted that the multiple extraction material storage containers 20 may be positioned on a stationary platform 30 and the multiple full immersion brewing devices 10 rotate around the stationary platform 30.

Figure 20:
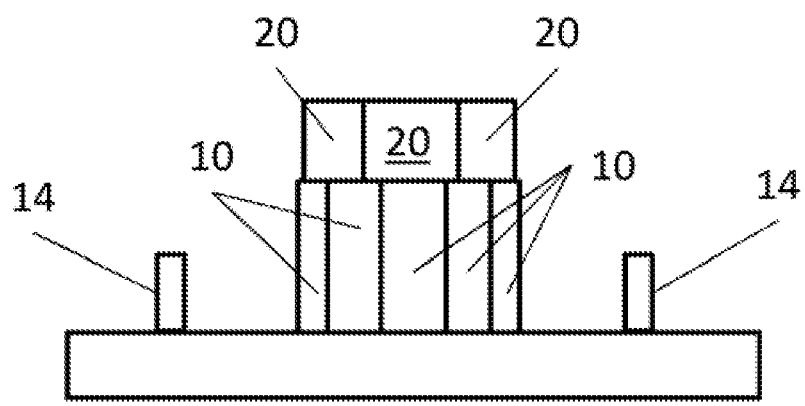
FIG. 20 illustrates a side view of the full immersion brewing system of FIG. 19 for multiple brewed liquids.

FIG. 20 illustrates a side view of the full immersion brewing system of FIG. 19 for multiple brewed liquids. FIG. 20 further illustrates dispensing devices 14 that enable the dispensing of the brewed liquids from the multiple full immersion brewing devices 10. The multiple full immersion brewing devices 10 may be connected to the dispensing devices 14 through appropriate conduits and valves (not shown) which enables the proper dispensing of the brewed liquid.

It is noted that the above infusion process may be realized at 130 psi to reduce the time for full infusion.

It is further noted that the extraction material valve may open into the immersion chamber so that the pressure inside the immersion chamber assists in keeping the extraction material valve sealed when infusing the extraction material and heated liquid. More specifically, by having the extraction material valve open into the immersion chamber, the infusion process can take place at 130 psi without risking the valve failing at the high pressure.

It is noted that the dispensing/drain valve inwardly opens into the immersion chamber. In this embodiment, a dispense valve is located inside a waste valve. The dispense valve has a filter screen so that when the dispense valve opens, the water is filtered and only used extraction material is left behind. When the waste valve is opened, the used extraction material can be washed out.

To wash out the immersion chamber, water (heated) is sprayed from the top of the immersion chamber out through the bottom, while the waste valve is open. In addition, water is pushed backwards through the filter screen while water from a top sprayer washes everything down through the waste valve.

It is noted that if filter screen is a 70 micron filter, to clean the filter, moving water jets are applied to filter screen to dislodge (blast) the extraction material trapped in the 70 micron "weave" pattern of the filter screen. As noted above, the moving water jets can be created by a concentrated narrow strip or slit.

It is noted that if filter screen is a 200 micron filter, to clean the filter, stationary water jets are applied to filter screen.

In the various embodiments described above, the valves for introducing material (extraction material, heated liquid, pressurized air, cleaning liquid, etc.) into the immersion chamber can be controlled automatically by a controller (not shown). The controller may be a processor performing a program for brewing and cleaning the immersion system. The controller may also be control circuit design to generate the control signals to operate the valves in an appropriate manner. The controller may also be a combination of hardware, firmware, and software.

It is further noted that the various valves which are associated with pressurized air may be used to vent the immersion chamber when appropriate.

It is further noted that the various embodiments, described above, may include pressure sensors to determine when an immersion chamber and/or accumulator/storage chamber is empty; e.g. the chamber is ready for cleaning or filling. By dispensing the infused or brewed liquid under pressure (introduction of pressurized air into the chamber), the emptying of the liquid from the chamber will cause a pressure drop. Sensing this pressure drop by a pressure sensor can be communicated to a controller so that the next cycle in the process can begin. For example, a drop of pressure during dispensing can trigger the controller to stop the dispensing cycle and begin a cleaning cycle.

It is also noted that the various embodiments, described above, may include heating elements in the chambers to maintain the temperature of the infused liquid or to assist the infusion process In summary, a full immersion brewing system includes an immersion chamber; an extraction material mechanism for introducing extraction material into the immersion chamber; an infusion mechanism for introducing heated liquid and pressurized air into the immersion chamber; and a drain/dispensing mechanism for dispensing, through a filter, infused liquid from the immersion chamber and for enabling removal of extraction material from the immersion chamber. The filter prevents extraction material from being dispensed from the immersion chamber.

When the drain/dispensing mechanism is in a first position, infused liquid is dispensed, through the filter, from the immersion chamber and when the drain/dispensing mechanism is in a second position, the filter is positioned so that extraction material and liquid is dispensed from the immersion chamber without going through the filter.

The full immersion brewing system may include a cleaning mechanism for cleaning, using a liquid, the immersion chamber, and the filter.

The cleaning mechanism may include multiple slots to create multiple liquid jets to clean the filter.

The filter may have an outer surface for engaging the extraction material and an inner surface.

The multiple slots may create multiple rotating liquid jets to clean the filter.

The cleaning mechanism may automatically clean the immersion chamber and the filter when it is determined that the immersion chamber cannot dispense any more infused liquid.

A full immersion brewing system includes an immersion chamber; a first support to support the immersion chamber; a second support to support the immersion chamber; and a floating valve. The immersion chamber includes an opening for introducing extraction material and heated liquid into the immersion chamber. The floating valve seals the immersion chamber by seating against the opening when the immersion chamber is filled with infused liquid. The first support introduces heated liquid into the immersion chamber. The second support introduces pressurized air into the immersion chamber. The immersion chamber is in a first position when infusing the heated liquid. The immersion chamber is in a second position when the immersion chamber dispenses infused liquid therefrom.

The floating valve may include a filter through which the infused liquid passes when the immersion chamber dispenses infused liquid therefrom, the filter preventing extraction material from being dispensed from the immersion chamber.

A full immersion brewing system includes an immersion chamber; an extraction material mechanism for introducing extraction material into the immersion chamber; a first mechanism for introducing heated liquid into the immersion chamber; a second mechanism for introducing pressurized air into the immersion chamber; and a drain/dispensing mechanism for dispensing, through a filter, infused liquid from the immersion chamber and for enabling removal of extraction material from the immersion chamber. The filter prevents extraction material from being dispensed from the immersion chamber.

When the drain/dispensing mechanism is in a first position, infused liquid is dispensed, through the filter, from the immersion chamber and when the drain/dispensing mechanism is in a second position, the filter is positioned so that extraction material and liquid is dispensed from the immersion chamber without going through the filter.

The full immersion brewing system may include a cleaning mechanism for cleaning the immersion chamber and the filter.

The cleaning mechanism may include multiple slots to create multiple liquid jets to clean the filter.

The filter may have an outer surface for engaging the extraction material and an inner surface.

The multiple slots may create multiple rotating liquid jets to clean the filter.

The cleaning mechanism may automatically clean the immersion chamber and the filter when it is determined that the immersion chamber cannot dispense any more infused liquid.

The first mechanism may introduce heated liquid into the immersion chamber through the extraction material mechanism.

The second mechanism may introduce pressurized air into the immersion chamber through the extraction material mechanism.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A full immersion brewing system, comprising:
an immersion chamber having an immersion chamber bottom, immersion chamber sides, and an immersion chamber top;
said immersion chamber bottom including a drain opening;
said immersion chamber bottom having an interior bottom surface and an exterior bottom surface;
an extraction chamber for receiving extraction material;
said extraction chamber having an extraction chamber top and an extraction chamber bottom, said extraction chamber bottom having a bottom opening, said extraction chamber top having a top opening;
said bottom opening of said extraction chamber being operatively connected to said immersion chamber top, said top opening of said extraction chamber receiving the extraction material;
an extraction material chamber mechanism including a valve mechanism and a cap, said valve mechanism being seated against said bottom opening and said cap being disengaged from said top opening when said extraction material chamber mechanism is in a closed state, said valve mechanism being disengaged from said bottom opening and said cap being engaged with said top opening when said extraction material chamber mechanism is in an open state;
an infusion mechanism, operatively connected to said cap, for allowing introduction of liquid and pressurized air into said immersion chamber; and
a drain/dispensing mechanism, operatively connected to said drain opening, for dispensing infused liquid from said immersion chamber and for removing extraction material from said immersion chamber;
said drain/dispensing mechanism including a filter and a filter top, said filter and filter top forming a filter volume, said filter engaging said interior bottom surface of said immersion chamber bottom when said drain/dispensing mechanism is in a dispensing state, said filter preventing the extraction material from being dispensed from said immersion chamber when said drain/dispensing mechanism is in said dispensing state, said filter preventing extraction material from entering into said filter volume when said drain/dispensing mechanism is in said dispensing state, said filter top having a filter top interior surface and a filter top exterior surface, said filter having a filter interior surface and a filter exterior surface for engaging the extraction material;
said drain/dispensing mechanism including a conduit operatively connected to said drain opening;
said drain/dispensing mechanism including a dispensing valve operatively connected to said conduit and a dispensing conduit operatively connected to said dispensing valve;

said dispensing valve being open when said drain/dispensing mechanism is in said dispensing state;
said filter disengaging from said interior bottom surface of said immersion chamber bottom when said drain/dispensing mechanism is in a cleaning state;
said drain/dispensing mechanism including a drain valve operatively connected to said conduit and a drain conduit operatively connected to said drain valve;
said drain valve being open when said drain/dispensing mechanism is in said cleaning state;
said drain valve being closed when said drain/dispensing mechanism is in said dispensing state;
said dispensing valve being closed when said drain/dispensing mechanism is in said cleaning state;
said drain/dispensing mechanism including a cleaning valve, a cleaning conduit operatively connected to said cleaning valve, and a cleaning mechanism operatively connected to said cleaning conduit;
said cleaning mechanism extending through said drain opening into said filter volume;
said cleaning valve being open when said drain/dispensing mechanism is in said cleaning state;
said cleaning valve being closed when said drain/dispensing mechanism is in said dispensing state;
said cleaning mechanism jetting liquid against said filter interior surface when said drain/dispensing mechanism is in said cleaning state to dislodge extraction material located on said filter exterior surface.

2. The full immersion brewing system as claimed in claim 1, wherein said cleaning mechanism is rotatable.

3. The full immersion brewing system as claimed in claim 2, wherein said cleaning mechanism includes multiple slots to create multiple liquid jets against said filter interior surface.

4. The full immersion brewing system as claimed in claim 2, wherein said cleaning mechanism automatically cleans said immersion chamber and said filter when said immersion chamber cannot dispense any more infused liquid.

5. The full immersion brewing system as claimed in claim 1, wherein said infusion mechanism includes:
   a first mechanism, operatively connected to said cap, for introducing liquid into said immersion chamber; and
   a second mechanism, operatively connected to said cap, for introducing pressurized air into said immersion chamber.

6. The full immersion brewing system as claimed in claim 5, wherein said cleaning mechanism is rotatable.

7. The full immersion brewing system as claimed in claim 6, wherein said cleaning mechanism includes multiple slots to create multiple liquid jets against said filter interior surface.

8. The full immersion brewing system as claimed in claim 6, wherein said cleaning mechanism automatically cleans said immersion chamber and said filter when said immersion chamber cannot dispense any more infused liquid.

* * * * *